United States Patent Office
3,392,030
Patented July 9, 1968

3,392,030
DOUGH CONDITIONERS
Robert W. Eltz, Media, Pa., assignor to Sun Oil Company, Philadelphia, Pa., a corporation of New Jersey
No Drawing. Filed Sept. 1, 1964, Ser. No. 393,716
4 Claims. (Cl. 99—91)

ABSTRACT OF THE DISCLOSURE

The disclosure relates to novel compositions and methods for conditioning baking dough. More particularly the disclosure teaches incorporating certain dehydro derivatives of enediols of 3-ketoglycosides in baking flour or mixed dough. It has been found that these compounds give dough and bread of improved volume, texture, and consistency. The 3-ketoglycosides are selected from the group consisting of 3-ketomaltose, 3-ketosucrose, 3-ketolactose, 3-ketomaltobionic acid and 3-ketolactobionic acid. The disclosure also describes novel compositions comprising the 3-ketoglycoside with glucose and glucose-oxidase and methods for conditioning bread using these compositions.

This invention relates to novel compositions and methods for conditioning baking dough, and more particularly to the use of dehydro derivatives of an enediol of 3-ketoglycosides as additives to flour and dough for the purpose of improving the quality of baked dough.

It is known in the art to add "conditioners" to baking dough for the purpose of improving the texture, taste, firmness, and size of the resulting doughs, particularly bread loaves. Thus, for example, it is known to use such conditioners as ascorbic acid, potassium bromate, potassium iodate or the like. However, these additives, and particularly ascorbic acid, are relatively expensive when used for this purpose in this basic commodity.

It is an object of this invention to provide an inexpensive yet effective conditioner for baking doughs. It is a further object of this invention to provide a conditioner which is readily available from low-cost materials. It is still a further object of the invention to provide a method of improving the quality of baking dough by the addition of a substance which will enhance its texture, size, and consistency without affecting its taste or other qualities.

It has now been found, in accordance with the present invention that these and other objects may be achieved by incorporating dehydro derivatives of enediols of 3-ketoglycosides in baking flour or mixed dough. By imparting a suitable amount of these compounds into the flour or dough and baking it under conventional conditions, the dough, and particularly loaves of bread will be of a greater volume and better texture and consistency than loaves baked without any such added conditioner. By the term "dough" as used throughout this description is meant a mixture of flour, water, leavening agent, salt and other additives which, when baked, yield bread, cake, and like materials.

These dehydro derivatives of enediols of 3-ketoglycosides employed in accordance with the present invention are readily obtainable by the oxidation and tautomerization of certain common sugars or sugar acids, as for example, the disaccharides such as maltose, sucrose, or lactose, or the bionic acids such as maltobionic acid or lactobionic acid, to form the enediols of 3-ketoglycosides; conversion of the enediols to the desired dehydro (diketo) form of 3-ketoglycosides can then be achieved by chemical or enzymatic means as described hereinbelow.

In the first step of converting a sugar to the corresponding dehydro derivative of an enediol of a 3-ketoglycoside, these enediols of 3-ketoglycosides are obtained by the oxidation and tautomerization of sugars or sugar acids. While chemical methods for oxidizing sugars to their corresponding 3-ketoglycosides are known, these methods are generally characterized by their low yields. However, means by which this oxidation may be achieved microbially have recently been reported whereby nearly stoichiometric conversions are obtained. Thus, for example, M. J. Bernaerts et al. have described in J. Gen. Microbiol., 22, 129–136 (1960); J. Micro. and Serology, 27, 247–256 (1961); and Nature, 197, 406–407 (1963) that 3-ketoglycosides are produced in high yield by the action of Agrobacterium sp. on disaccharides and bionic acids. The 3-ketoglycosides which may be prepared by this method include such compounds as 4-(3-keto-α-D-glucosido)-D-glucose (hereinafter referred to as "3-ketomaltose"), derived from maltose; α-3-keto-D-glucopyranosyl-β-D-fructofuranoside (hereinafter referred to as "3-ketosucrose") derived from sucrose; 4-(3-keto-β-D-galactosido)-D-glucose (hereinafter referred to as "3-ketolactose"), derived from lactose; 4-(3-keto-α-D-glucosido)-D-gluconic acid (hereinafter referred to as "3-ketomaltobionic acid"), derived from maltobionic acid; 4-(3-keto-β-D-galactosido)-D-gluconic acid (hereinafter referred to as "3-ketolactobionic acid") derived from lactobionic acid; and like compounds.

These 3-keto compounds are then conveniently tautomerized to their corresponding 2,3-enediol form under alkaline conditions, at room temperature, or by boiling with strong acids such as sulfuric acid. Thus, for example, 3-ketolactose converts to its enediol form, when treated with dilute sodium hydroxide, as follows:

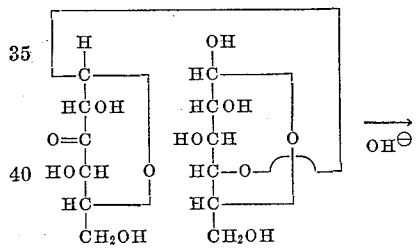

Similarly, each of the other 3-ketoglycosides may thus be treated to form a compound having the partial structure:

which structure, while it possesses some activity as a dough conditioner, is preferably converted to its more active dehydro (diketo) form for use in flour and doughs.

While compounds of the foregoing partial structure will hereinafter be referred to as "2,3-enediols" it is understood that these compounds also encompass compounds having a 3,4-enediol arrangement since the structure of these highly complex molecules has not as yet been fully characterized.

Oxidation of the enediols of 3-ketoglycosides to form the corresponding dehydro derivatives can be achieved by chemical means, as for example, by oxidation with a peroxide oxidizing agent such as hydrogen peroxide, or with such oxidizing agents as $FeCl_3$, $I_2$, quinones, or the like. However, this method is characterized not only by low yields, but also the fact that the labile characteristics of the dehydro form make it difficult to have the oxidation proceed so that it is not further oxidized beyond the formation of this compound. A more preferred method for preparing the dehydro form of the enediols of 3-ketoglycosides, is by the in situ oxidation of the corresponding enediols by the action of enzymes present in or added to the dough mixture, preferably glucose-oxidase, which is available in commercial form. This enzyme, it has been found, when added with the enolic 3-ketoglycosides, together with glucose, to mixed doughs containing insufficient natural enzymes to perform this function, substantially enhances the activity of the enediol derivative, due to the oxidation of the enediol to its corresponding dehydro form. While applicant does not wish to be bound by any theoretical considerations, it is believed that the enzyme acts not on the enediol directly to form the dehydro derivative, but rather on the added glucose, which in turn results in the slow but continuous formation of hydrogen peroxide, with the result that the oxidation is much greater than if hydrogen peroxide were added directly to the enolic 3-ketoglycoside or dough mixture containing the same.

The amount of 3-ketoglycoside, glucose, and glucose-oxidase to be added to the dough will vary depending upon the type of flour employed and the nature of the baked goods desired. Generally, for example, in the preparation of bread, it is satisfactory if from about 0.004 to 0.10 gm. of the dehydro derivative of an enediol of a 3-ketoglycoside are adder per kilogram of flour, together with from about 2 to 10 gm. of glucose, and from about 0.05 to 0.5 gm. of a glucose-oxidase preparation having about 700 to 1200 Sarett units per gram. These three components may be conveniently added in dry powder form separately or as a mixture, together with other desired food additives, either to the dry flour or to the prepared dough mixture just prior to baking. When added to the dry flour no interaction takes place until water is introduced in the preparation of the dough, so that flour treated in this manner may be conveniently stored until ready for use without any loss of activity of the added conditions. Alternatively, it will be understood that this invention also contemplates the use of the dehydro form of the enediols of 3-ketoglycosides when they are independently prepared by chemical means rather than in situ with glucose and glucose-oxidase.

Example 1

(A) 0.9 gm. of the 2,3-enediol of 3-ketomaltose, 23 gms. of glucose, and 0.9 gm. of glucose-oxidase are intimately admixed with 4500 gm. of wheat flour together with water, yeast, salt, and other conventional dough ingredients. When baked as bread, this mixture produces 10 loaves having an average volume of about 3050 cc. Each loaf is fine-textured and of firm consistency.

(B) When the foregoing experiment is repeated using only the 2,3-enediol of 3-ketomaltose, loaves having an average volume of only 2795 cc. are formed, the bread being crumbly and of coarse texture.

(C) By way of control, two additional batches of bread are prepared as in Example 1(A), except that the first batch contains only glucose and glucose-oxidase, while the second batch contains no added conditioners, glucose or glucose-oxidase whatever. The resulting loaves of bread have an average volume of 2700 cc. for the first batch, and 2605 cc. for the second batch. The bread in both instances is crumbly and of coarse texture.

Example 2

To 10 kg. of flour are added 2.0 gm. of the 2,3-enediol of 3-ketosucrose, 50 gm. of glucose, and 2.0 gm. of glucose-oxidase. The dry flour is stored for one month at room temperature and then prepared as bread dough and baked into separate loaves. Each loaf has an average volume of 2965 cc.; the texture and consistency of each loaf is indistinguishable from those in Example 1(A) (above).

Example 3

Example 2 is repeated except that a pre-prepared amount of the dehydro derivative of the 2,3-enediol of 3-ketolactose is substituted for the combination of the 2,3-enediol of 3-ketosucrose plus glucose and glucose-oxidase. The baked loaves of bread have an average volume of 2910 cc. while the texture is slightly coarse and of crumbly consistency.

The dehydro derivative of the 2,3-enediol of 3-ketolactose employed in the foregoing example may be prepared as follows:

A 10% weight volume aqueous solution of the enediol of 3-ketolactose is titrated with a slight excess of hydrogen peroxide at pH 7. At the end of the titration finely divided iron filings are added to the solution and the solution stirred until no more oxygen is evolved. The solution is filtered to remove the iron filings, and the filtrate is evaporated to dryness under vacuum at a temperature not above about 40° C. and the solid dehydro derivative of the 2,3-enediol of 3-ketolactose is recovered.

In a like fashion, the dehydro derivatives of the enediols of 3-ketosucrose, 3-ketomaltose, 3-ketomaltobionic acid and 3-ketolactobionic acid may also be prepared and used in accordance with the foregoing description.

I claim:

1. A composition for improving the quality of dough comprising a mixture of an enediol of a 3-ketoglycoside, glucose, and glucose-oxidase, said 3-ketoglycoside selected from the group consisting of 3-ketomaltose, 3-ketosucrose, 3-ketolactose, 3-ketomaltobionic acid and 3-ketolactobionic acid.

2. An improved baking dough composition comprising said dough having intimately admixed therein a minor amount of a dehydro derivative of an enediol of a 3-ketoglycoside, said 3-ketoglycoside selected from the group consisting of 3-ketomaltose, 3-ketosucrose, 3-ketolactose, 3-ketomaltobionic acid and 3-ketolactobionic acid.

3. An improved flour containing an enediol of a 3-ketoglycoside, glucose, and glucose-oxidase, said 3-ketoglycoside selected from the group consisting of 3-ketomaltose, 3-ketosucrose, 3-ketolactose, 3-ketomaltobionic acid and 3-ketolactobionic acid.

4. An improved flour containing a dehydro derivative of an enediol of a 3-ketoglycoside, said 3-ketoglycoside selected from the group consisting of 3-ketomaltose, 3-ketosucrose, 3-ketolactose, 3-ketomaltobionic acid and 3-ketolactobionic acid.

References Cited

UNITED STATES PATENTS 2,744,017   5/1965   Baldwin _____ 99—91 X

FOREIGN PATENTS 503,476   3/1939   Great Britain.
787,225   12/1957   Great Britain.

OTHER REFERENCES

Braverman: "Introduction to the Biochemistry of Foods," 1963, Elsevier Publishing Co., New York, pp. 205, 206, 207.

MAURICE W. GREENSTEIN, Primary Examiner.

JOSEPH M. GOLIAN, Examiner.